United States Patent
Yang et al.

(10) Patent No.: US 7,761,886 B2
(45) Date of Patent: Jul. 20, 2010

(54) DISK DEVICE

(75) Inventors: Chang-Lin Yang, Taipei Hsien (TW); Chien-Ming Fan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 848 days.

(21) Appl. No.: 11/616,830

(22) Filed: Dec. 27, 2006

(65) Prior Publication Data

US 2007/0274034 A1    Nov. 29, 2007

(30) Foreign Application Priority Data

May 26, 2006    (CN)    .................. 2006 1 0060789

(51) Int. Cl.
G11B 17/04    (2006.01)
(52) U.S. Cl. ..................................... 720/613
(58) Field of Classification Search .......... 720/601–613
See application file for complete search history.

(56) References Cited

U.S. PATENT DOCUMENTS

| | | | | |
|---|---|---|---|---|
| 6,208,605 B1 | | 3/2001 | Akiba | |
| 7,328,441 B2 | * | 2/2008 | Tsao | 720/613 |
| 7,389,518 B2 | * | 6/2008 | Chan et al. | 720/601 |
| 7,467,393 B2 | * | 12/2008 | Lee et al. | 720/610 |
| 2003/0142610 A1 | * | 7/2003 | Yeh et al. | 369/75.2 |
| 2003/0227855 A1 | * | 12/2003 | Chen | 369/75.2 |
| 2004/0221300 A1 | * | 11/2004 | Chen | 720/610 |
| 2005/0010937 A1 | * | 1/2005 | Chen et al. | 720/610 |
| 2007/0067782 A1 | * | 3/2007 | Yang | 720/610 |

* cited by examiner

Primary Examiner—Mark Blouin
(74) Attorney, Agent, or Firm—Jeffrey T. Knapp (57) ABSTRACT

A disk device includes a frame defining a tray housing and a rail housing communicating with the tray housing; a tray releasably received in the tray housing in the frame; and a rail movably incorporated in the rail housing. The rail includes a slide for drawing the tray out of the frame, and a latching member for detachably engaging with the tray. The slide is movable along a first direction that exposes from the rail housing, the latching member is movable along a second direction substantially perpendicular to the first direction between a first position where the latching member is engaged with the tray and a second position where the latching member is disengaged with the tray.

18 Claims, 8 Drawing Sheets

DISK DEVICE

BACKGROUND OF THE INVENTION

1. Field of the Invention

The present invention relates to disk devices.

2. Description of Related Art

Disk devices such as notebook computers and laptop computers are constructed as compact as possible for portable purposes. In order to reduce the computers to compact sizes, disk devices associated with desktop computers are slimmed in order to save space.

A general slim-type disk device is introduced as an example. The slim-type disk device includes a frame, a tray, a brake, and an ejector. The tray is slidably received in the frame and includes a front bezel attached to the tray. The brake is incorporated in the front of the frame for releasably locking the tray in the frame, and includes a button, an L-shaped lever pivotally secured in the frame, and a first spring. The button protrudes through the front bezel and further attaches to the L-shaped lever. The L-shaped lever includes a hook portion arranged at a free end of the L-shaped lever for detachably locking the tray. The first spring is used to apply a restoration force to rotate the L-shaped lever, and includes a first end connected to the L-shaped lever, and a second end connected to the frame. The ejector is accommodated in the rear side of the frame and is used to eject the tray out of the frame partially. When the button is pushed along the front bezel, a pressure is applied to rotate the L-shaped lever, and thus makes the hook portion separate from the tray. Simultaneity, the ejector ejects the tray out from the frame partially. Further pulling of the tray is needed after the tray is partially out. When the tray is substantially entirely exposed, a disk is replaceable in the tray.

However, in order to substantially entirely exposure the tray from the frame, two operating steps including pushing the button in a first direction which is parallel to the front bezel, and drawing the tray from the frame in a second direction which is perpendicular to the front bezel are necessary. Therefore, operations of the disk device become inconvenient for users.

What is needed, therefore, is a disk device with convenient properties.

SUMMARY OF THE INVENTION

A disk device includes a frame defining a tray housing and a rail housing communicating with the tray housing; a tray releasably received in the tray housing in the frame; and a rail movably incorporated in the rail housing. The rail includes a slide for drawing the tray out of the frame, and a latching member for detachably engaging with the tray. The slide is movable along a first direction that exposes from the rail housing, the latching member is movable along a second direction substantially perpendicular to the first direction between a first position where the latching member is engaged with the tray and a second position where the latching member is disengaged with the tray.

BRIEF DESCRIPTION OF THE DRAWINGS

Other advantages and novel features will become more apparent from the following detailed description of preferred embodiments when taken in conjunction with the accompanying drawings, in which.

DETAILED DESCRIPTION OF THE INVENTION

In the following embodiments, a disk device such as a slim-type optical disk drive is used as an example for illustration.

Figure 1:
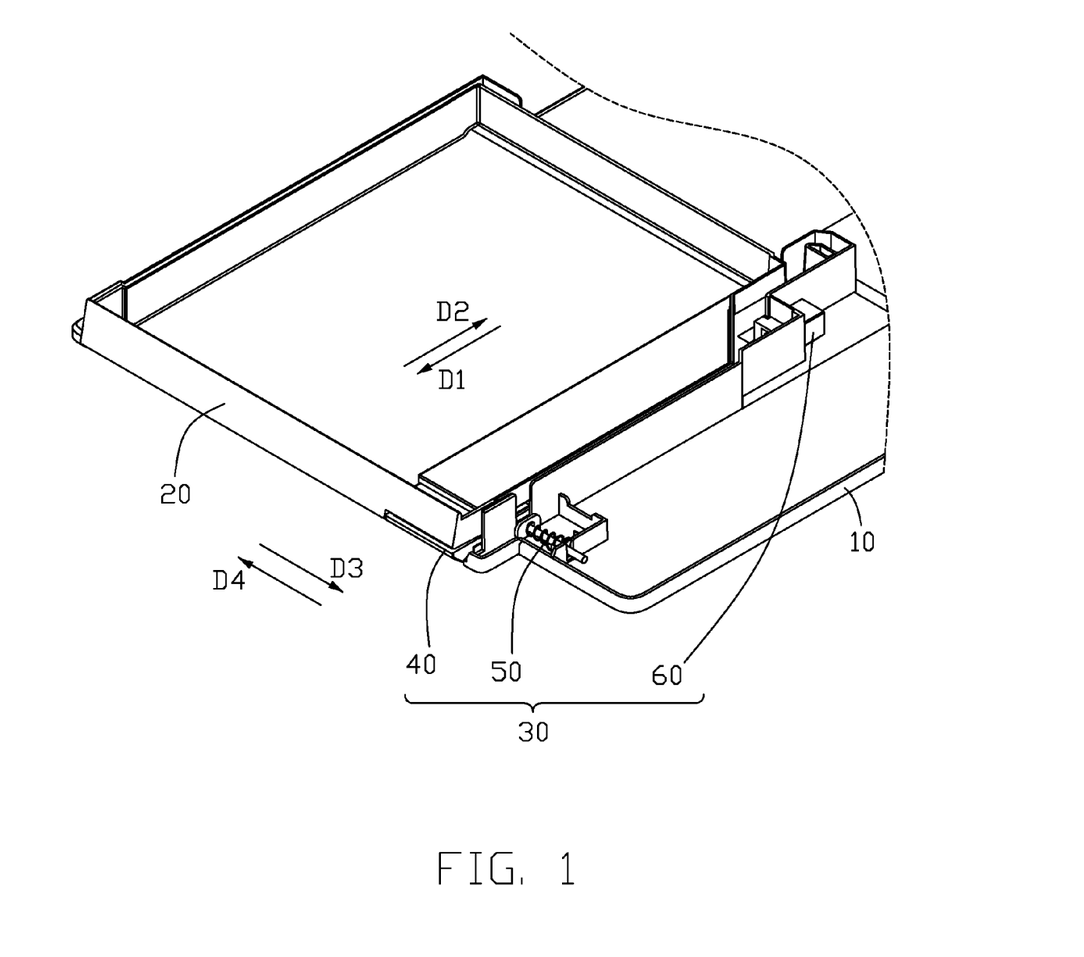
FIG. 1 is an isometric view of a disk device in according with a first embodiment.
Figure 2:
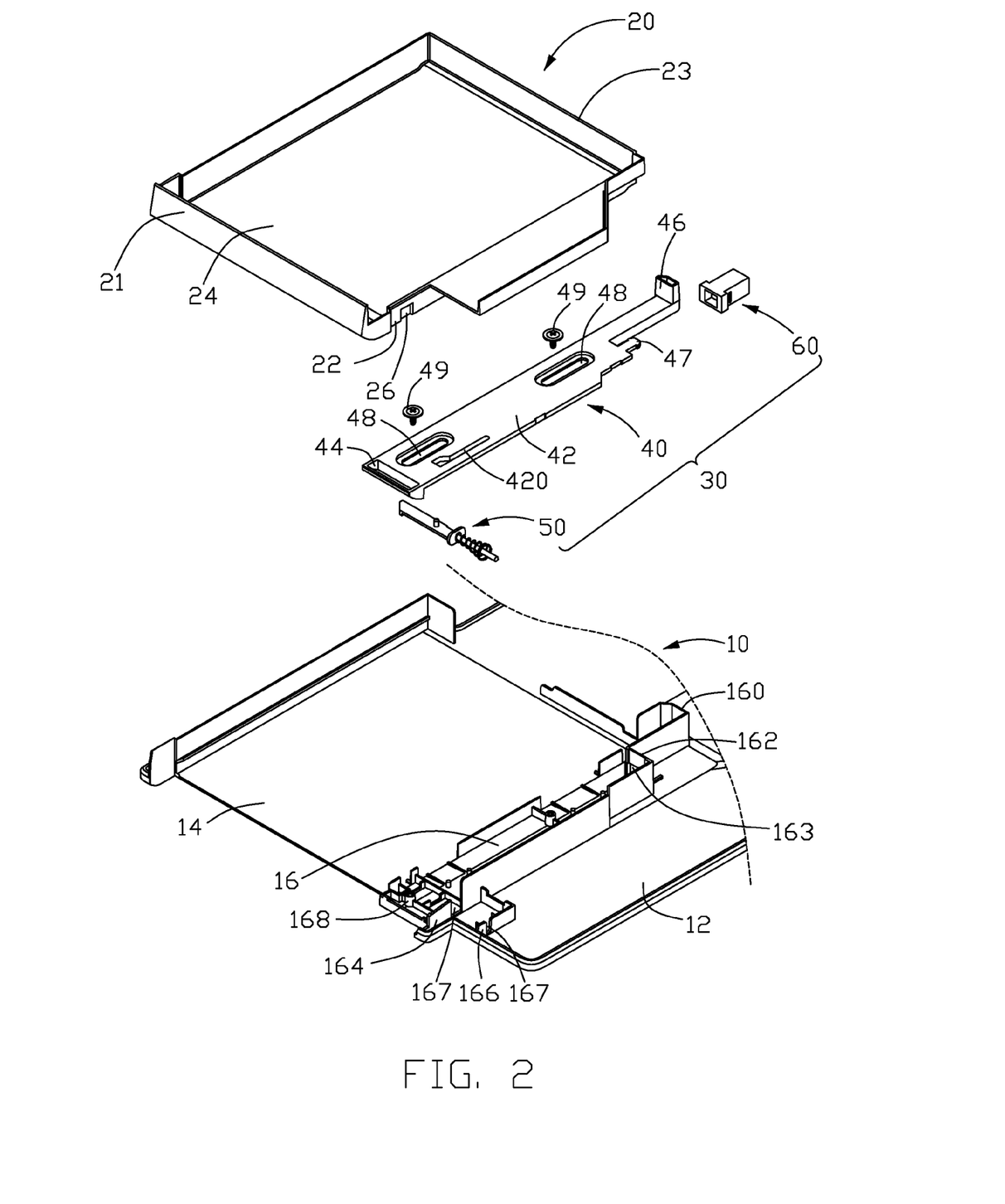
FIG. 2 is an exploded, isometric view of the disk device of FIG. 1
Figure 3:
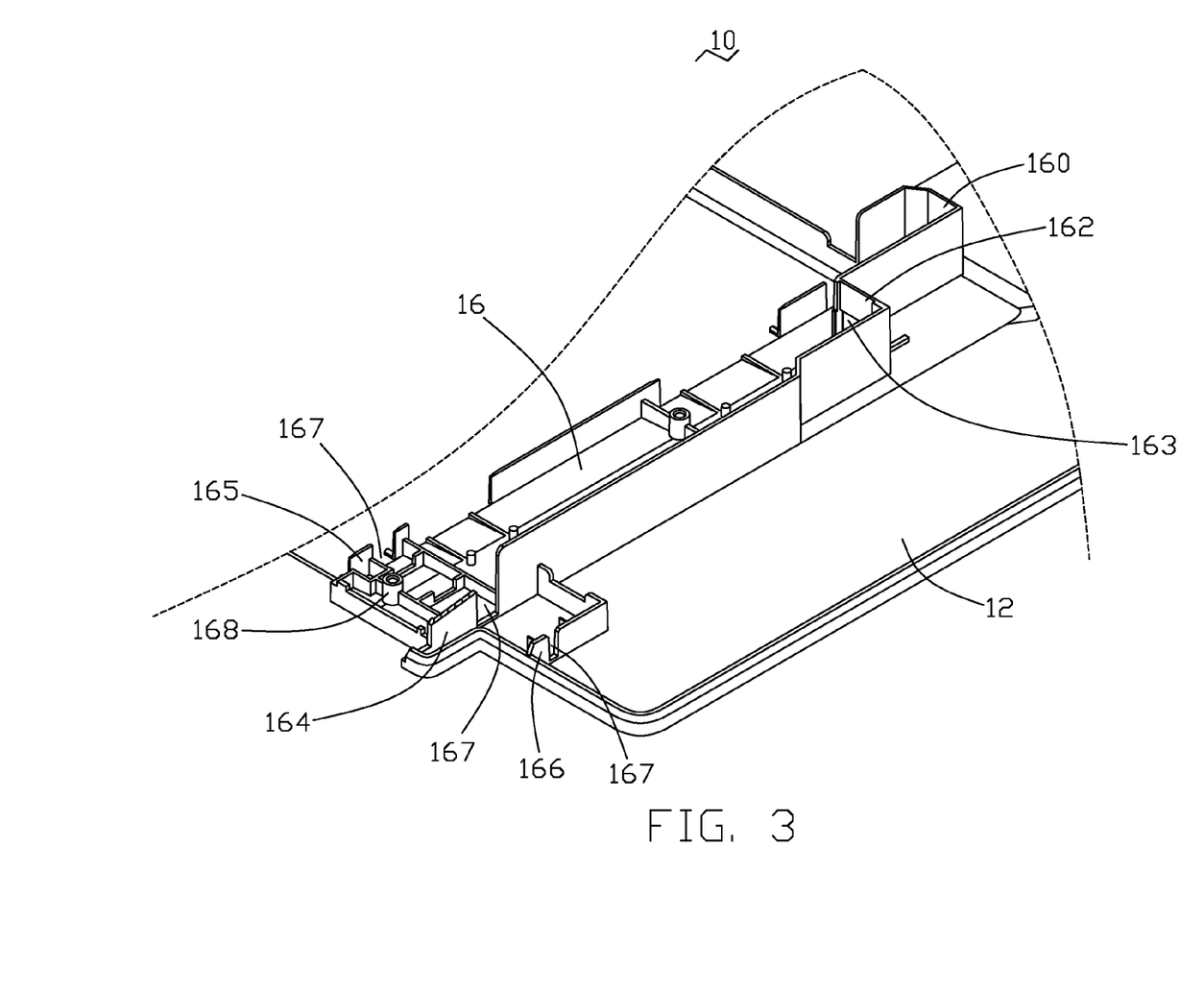
FIG. 3 is an exploded, isometric view of a brake of FIG. 2.

Referring to FIGS. 1 to 3, a disk drive according to a first embodiment is illustrated. The disk drive includes a frame 10, a tray 20, and a rail 30. The frame 10 defines a tray housing 14 for releasably receiving the tray 20, and a rail housing 16 communicating with the tray housing 14 for releasably receiving the rail 30.

In detail, the frame 10 includes a base 12, and a plurality of walls (not labeled) defining the tray housing 14 and the rail housing 16. Adjacent a rear/inner side of the rail housing 16, a restricting wall 160 and a first mounting wall 162 perpendicularly extend from the base 12 of the frame 10 juxtapose to each other. A mounting hole 163 is defined in the mounting wall 162. In the front side of the rail housing 16, a second mounting wall 164, a third mounting wall 165, and a fourth mounting wall 166 perpendicularly extend from the base 12 of the frame 10 and spaced from each other. The third mounting wall 165 and the forth mounting wall 166 are arranged at opposite sides of the second mounting wall 164. Each of the second mounting wall 164, the third mounting wall 165, and the fourth mounting wall 166 define a mounting opening 167. Two mounting posts 168 protrude from the base 12 and are arranged along the rail housing 16 for allowing the rail 30 to be slidably mounted thereon.

The tray 20 is slidable along a first direction D1 to expose from the frame 10. The tray 20 includes a front wall 21, a side wall 22, and a rear wall 23. A load housing 24 is defined by an enclosure of the front wall 21, the side wall 22, and the rear wall 23 for loading an object such as a disk or anything else. A bolt receiving hole 26 is defined in the sidewall 22 for the rail 30 to engage therein.

Figure 4:
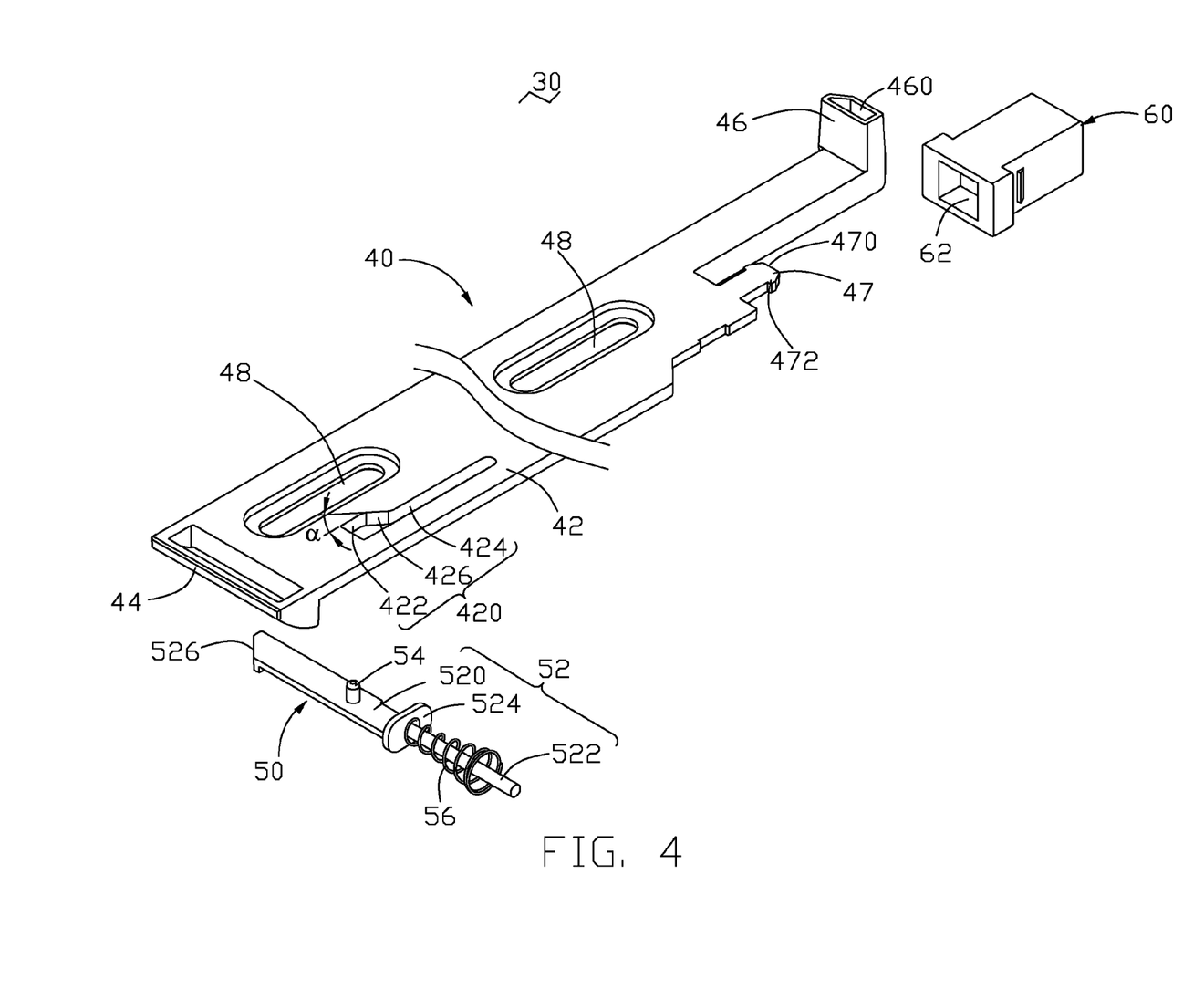
FIG. 4 is an isometric, partial view of a frame of FIG. 2, with the brake being removed, and a part of a sidewall being cut away.

Referring also to FIG. 4, the rail 30 includes a slide 40 for drawing the tray 20 out of the frame 10, a latching member 50 configured for detachably engaging with the tray 20, and a buckle 60 for releasably retaining the slide 40 in the frame 10. The slide 40 includes an elongated sliding portion 42, a handle portion 44, a pulling portion 46, and a hook tab portion 47. The handle portion 44 and the pulling portion 46 are arranged at opposite ends of the sliding portion 42, the hook tab portion 47 juxtaposes the pulling portion 46. Two guiding channels 48 are defined in the sliding portion 42, and extend in a longitudinal direction of the sliding portion 42 (when the sliding portion 42 is received in the rail housing 16, the longitudinal direction means the first direction D1).

In detail, the sliding portion 42 is slidably accommodated in the rail housing 16, and defines an actuating channel 420 therein to allow the latching member 50 to move in a third direction D3 away from the tray 20. The third direction D3 is substantially perpendicular to the first direction D1. The actuating channel 420 is L-shaped, and includes a first guiding surface 422 extending along the first direction D1, a second guiding surface 424 parallel to the first guiding surface 422, and an actuating surface 426 interconnecting the first and second guiding surface 422 and 424. An angle α is defined between the first guiding surface 422 and the actuating surface 426.

The handle portion 44 exposes from the frame 10 and is allowed to be pulled in the first direction D1 and pushed in a second direction D2 opposite to the first direction D1.

The pulling portion 46 extends from the sliding portion 42 perpendicularly for pulling the tray 20 to move out from the frame 10 when the slide is driven to move along the first direction D1. A hollow 460 is defined in the pulling portion 46 and is capable of working as a buffer to absorb a shock between the pulling portion 46 and the restricting wall 1160 when the tray 20 is substantially entirely retracted into the frame 10.

The hook tab portion 47 includes a free end 470, two wedges 472 extend at two opposite sides of the free end 470. The buckle 60 is secured to the mounting hole 163 defined in the first mounting wall 162 of the frame 10. The buckle 60 defines a clipping hole 62 for the hook tab portion 47 to be inserted in so that the slide 40 can be retained in the rail housing 16.

The latching member 50 includes a bolt 52 for detachably engaging in the bolt receiving hole 22 of the tray 20, a positioning pin 54 secured on the bolt 52 and is configured for engaging in the actuating channel 420. A spring 56 partially engages around the bolt 52 for urging the positioning pin 54 to contact at least one of the first guiding surface 422, the second guiding surface 424, and the third surface 426. The bolt 52 includes a locking board 520 where the positioning pin 54 extends from, a guiding rod 522 for the spring 56 to engage therearound, and a blocking sheet 524 for restricting the spring 56. The locking board 520 and the guiding rod 522 are aligned and arranged at two opposite sides of the blocking sheet 524. A free end of the locking board 520 forms a bolt end 526 that is substantially wedge-shaped and is configured for engaging in the bolt receiving hole 26.

Figure 5:
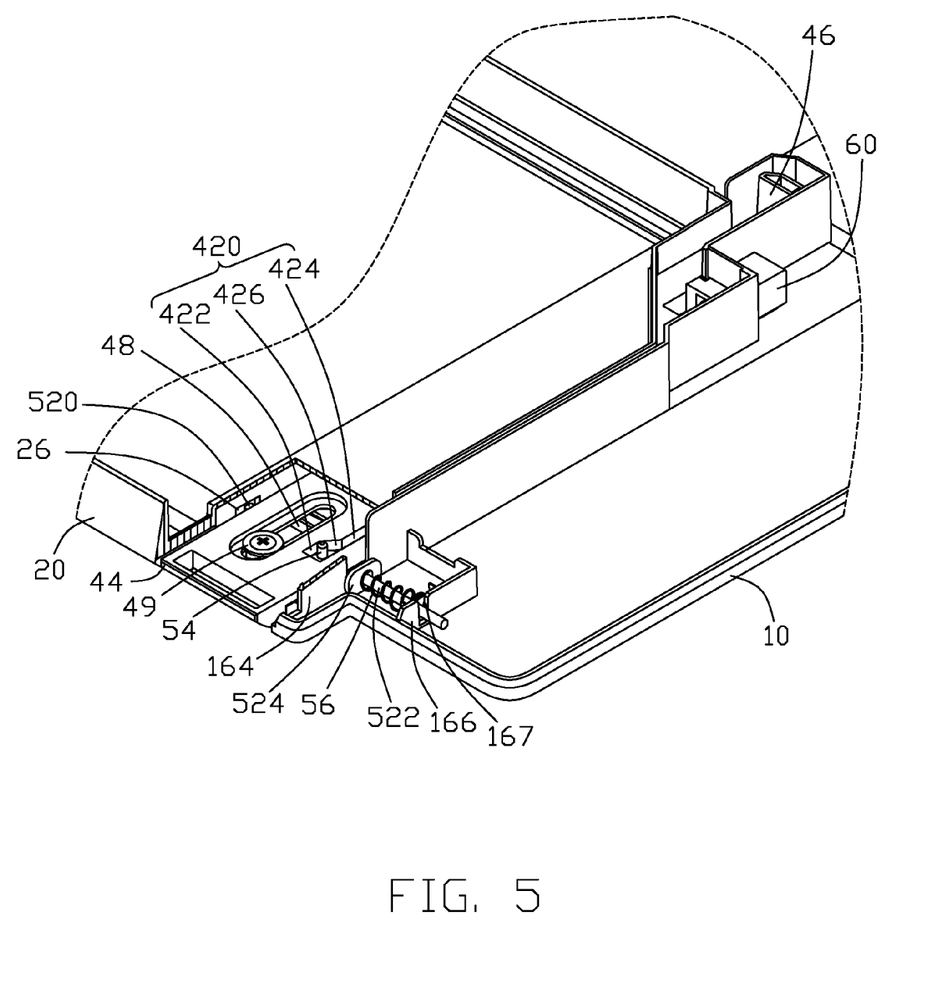
FIG. 5 is an isometric, partial view of the disk device of FIG. 1, with parts of the tray and the sidewall of the frame being cut away, and a draw-bar of the brake being in a retracted state.
Figure 6:
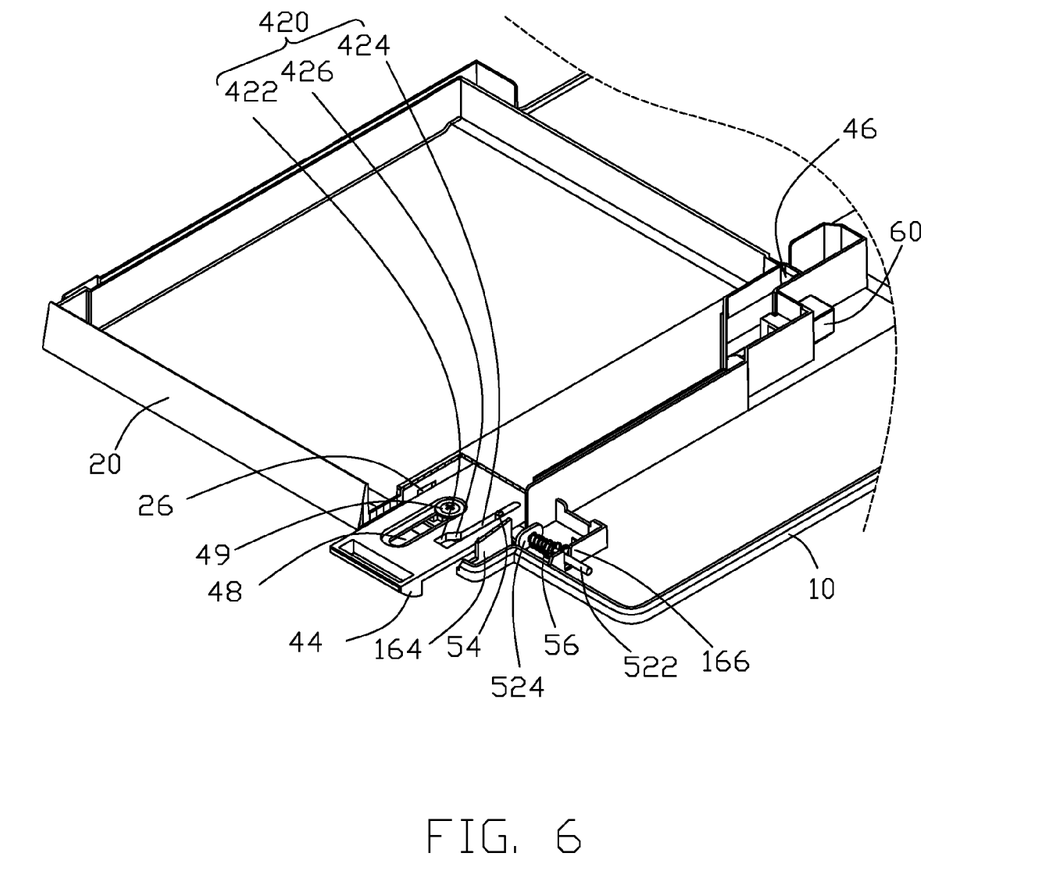
FIG. 6 is an isometric, partial view of the disk device of FIG. 1, with the parts of the tray and the sidewall of the frame being cut away, and the draw-bar of the brake being in an extended state.

Referring also to FIGS. 5 and 6, the locking board 520 is inserted in the mounting opening 167 defined in the second mounting wall 164. The bolt end 526 is inserted in the mounting opening 167 defined in the third mounting wall 165. The guiding post 522 is inserted through the mounting opening 167 defined in the fourth wall 166. The blocking sheet 524 is arranged between the second mounting wall 164 and the fourth mounting wall 166, and is restrained by the second mounting wall 164. The spring 56 is resiliently restricted between the blocking sheet 524 and the fourth mounting wall 166 and urges the bolt end 526 to pass through the mounting hole 167 defined in the third mounting wall 165. The buckle 60 is fixed in the first mounting wall 162 via the mounting hole 163. The slide 40 is inserted in the rail housing 14. The pulling portion 46 and the hook tab portion 47 respectively face the restricting wall 160 and the clipping hole 62 of the buckle 60. The hook tab portion 47 engages in the clipping hole 62 to retain the slide 40 when the pulling portion 46 contacts the restricting wall 160. The positioning pin 54 inserts into the actuating channel 420. Two screws 49 respectively pass through the corresponding guiding channels 48, and screw into the corresponding mounting posts 168, and thus the slide 40 is capable of sliding along the first direction D1 or the second direction D2 opposite to the first direction D1. The tray 20 is placed into the tray housing 14, with the bolt receiving hole 26 being inserted with the bolt end 526 of the bolt 52.

To draw the tray out of the tray housing, the handle 44 of the slide 40 is pulled along the first direction D1, the hook tab portion 47 simultaneity separates from the clipping hole 62. The positioning pin 54 moves from the first guiding surface 422 to the second guiding surface 424 via the actuating portion 426. A pressure is applied to the bolt 52 by the actuating portion 426. The bolt 52 is thus driven to move along a third direction D3 that deviates from the bolt receiving hole 26. Consequently, the tray 20 is exposed from the frame 10 since a pulling force is applied on the rear wall 23 of the tray 20 by the pulling portion 46.

To have the tray holding draw in the tray, the front wall 21 of the tray 20 is pushed along the second direction D2, and the pulling portion 46 is pushed by the rear wall 23, thereby the slide 40 moves along with the tray 20. The positioning pin 54 moves from the second guiding surface 424 to the first guiding surface 422 via the actuating portion 426. A pressure is applied to the bolt 52 by the actuating portion 426. The bolt 52 is thus driven to move along a fourth direction D4 that moves towards the tray 20 to engage in the bolt receiving hole 26. The hook tab portion 47 is simultaneity inserted into the clipping hole 62, and thus the slide 40 is entirely received into the rail housing 16. Consequently, the tray 20 is retracted into the frame 10. Either the exposure or the retraction of the tray 20 becomes convenient because the only operation that a user needs to do is to either pull or push the tray 20.

Figure 7:
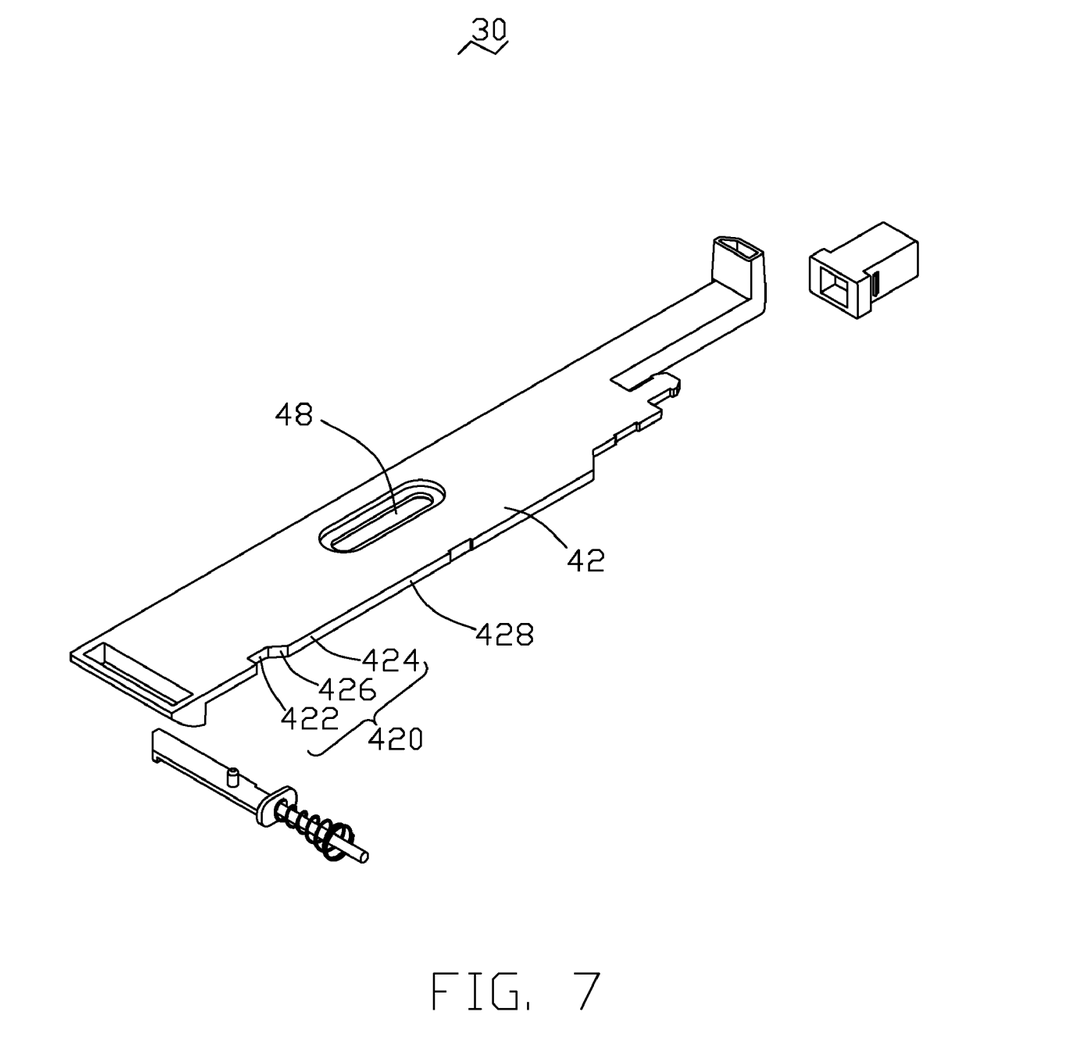
FIG. 7 is an exploded, isometric view of a brake of a disk device in according with a second embodiment.
Figure 8:
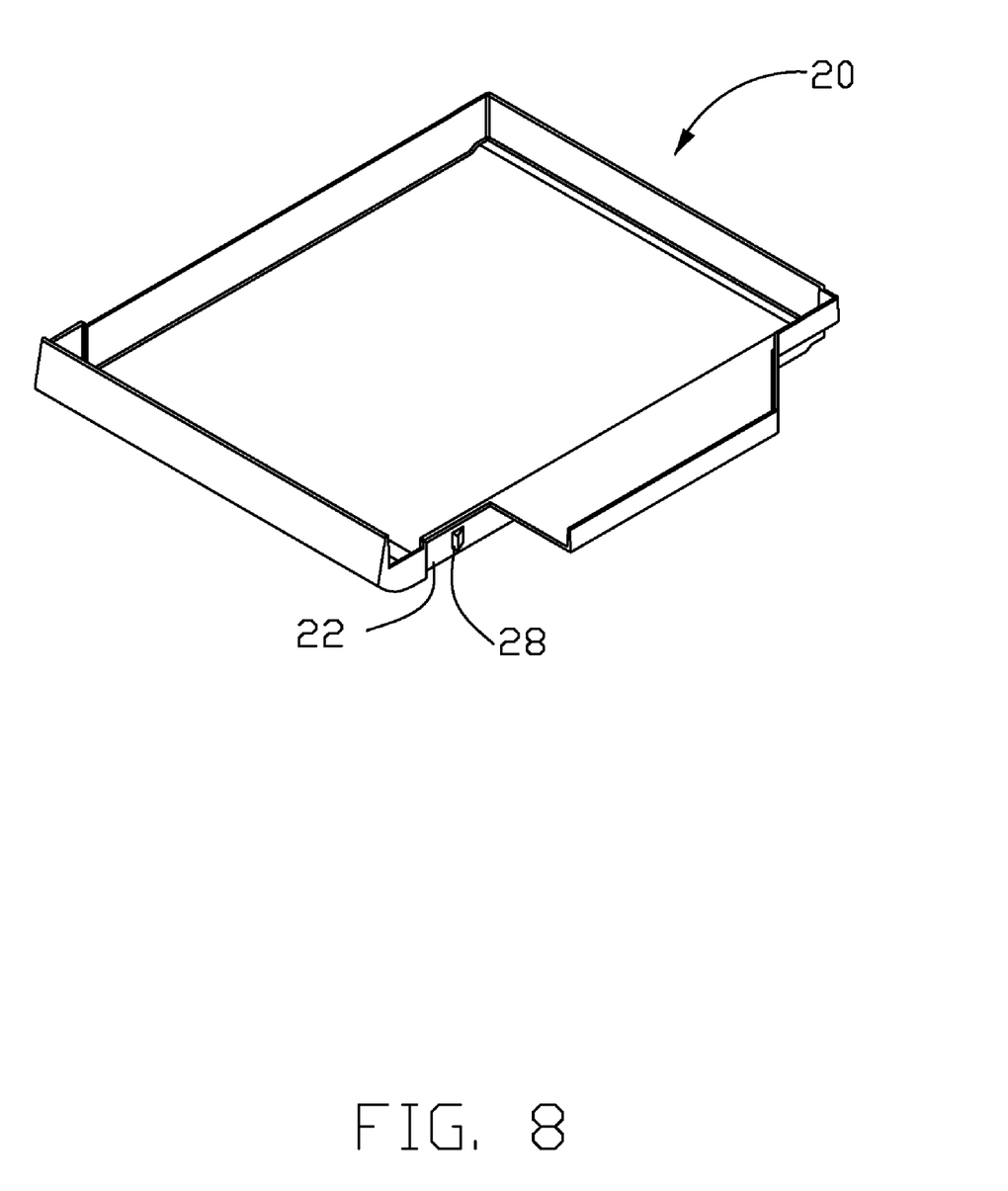
FIG. 8 is an exploded, isometric view of a frame of a disk device in according with a second embodiment.

Referring also to FIGS. 6 and 7, in alternative embodiments, the actuating channel 420 illustrated in the first embodiment may also be repositioned at an side 428 of the sliding portion 42. That is, the second guiding surface 424 has an area in common with the side 428, the first guiding surface 422 and the actuating surface 426 define a cutout adjacent to the side 428. A quantity of the guiding channels 48 is not limited to be two, it may also be one, three or more. The locking concave 26 in the sidewall 22 of the tray 20 may be a locking protrusion 28 extending from the sidewall 22. Understandably, the load housing 24 may be also used to accommodate a numeric keyboard (not shown) or the like.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A disk device comprising:
  a frame including a tray housing and a rail housing communicating with the tray housing;
  a tray releasable received in the tray housing; and
  a rail movably incorporated in the rail housing, and comprising a slide configured for drawing the tray out of the frame, and a latching member configured for detachably engaging with the tray, the slide being movable along a first direction that exposes from the rail housing, the latching member being movable along a second direction substantially perpendicular to the first direction between a first position where the latching member is engaged with the tray and a second position where the latching member is disengaged with the tray;
  wherein the slide comprises a sliding portion slidably accommodated in the rail housing, a handle portion exposed from the frame and configured for being pulled along the first direction, and a pulling portion configured for pulling the tray to move out from the frame, the handle portion and the pulling portion are arranged at two opposite ends of the sliding portion.

2. The disk device as claimed in claim 1, wherein the sliding portion comprises an actuating portion for making the latching member move in a second direction away from the tray and substantially perpendicular to the first direction.

3. The disk device as claimed in claim 2, wherein the actuating portion comprises a first guiding surface extending along the first direction, a second guiding surface substantially parallel to the first guiding surface, and an actuating surface interconnecting the first guiding surface and the second guiding surface, an angle is defined between a direction that the actuating surface extends along and the first direction.

4. The disk device as claimed in claim 3, wherein the slide further comprises a hook tab portion arranged at the same side of the pulling portion, the rail further comprises a buckle secured in a mounting wall arranged at a rear side of the frame, the hook tab portion detachably engages in the buckle in a manner so as to retain the slide in the rail housing.

5. The disk device as claimed in claim 4, wherein the sliding portion further defines at least one guiding channel therein for at least one corresponding guiding pin inserted therethrough, the at least one guiding channel extends along the first direction.

6. The disk device as claimed in claim 5, wherein the latching member comprises a bolt configured for detachably engaging with a stopping portion positioned on the tray along the second direction, a positioning pin protruded from the bolt and configured for engagable with the actuating portion, and a spring engaging around the bolt and configured for urging the positioning pin to contact at least one of the first guiding surface, the actuating surface and the second guiding surface, the positioning pin is movable between the first guiding surface and the second guiding surface via the actuating portion along with movements of the sliding portion.

7. The disk device as claimed in claim 6, wherein the bolt comprises a locking board configured for engaging with the stopping portion, a guiding rod configured for engaging in the spring, a blocking sheet configured for being urged by the spring, the locking board and the guiding rod are arranged at two opposite sides of the blocking sheet.

8. The disk device as claimed in claim 3, wherein the hook tab comprises a free end, two wedges arranged at two opposite sides of the free end and configured for being inserted into a clipping hole defined in the buckle.

9. The disk device as claimed in claim 8, wherein the frame further comprises a restricting wall juxtaposed to the mounting wall, the pulling portion defines a hollow therein for absorbing shocks between the pulling portion and the restricting wall.

10. A disk device comprising:
a frame including a tray housing configured for receiving a tray, and a carriage housing communicating with the tray housing; and
a carriage movably incorporated in the carriage housing, and comprising a slide configured for carrying the tray along a first direction, and a latching member movable along a second direction substantially perpendicular to the first direction;
wherein the slide comprises a sliding portion slidably accommodated in the carriage housing, a handle portion exposed from the carriage housing and configured for being pulled along the first direction, and a pulling portion configured for pulling the tray to move out from the tray housing, the handle portion and the pulling portion are arranged at two opposite ends of the sliding portion.

11. The disk device as claimed in claim 10, wherein the sliding portion comprises an actuating portion configured for making the latching member move in the second direction away from the tray and substantially perpendicular to the first direction.

12. The disk device as claimed in claim 11, wherein the actuating portion comprises a first guiding surface extending along the first direction, a second guiding surface substantially parallel to the first guiding surface, and an actuating surface interconnecting the first guiding surface and the second guiding surface, an angle is defined between a direction that the actuating surface extends along and the first direction.

13. The disk device as claimed in claim 12, wherein the slide further comprises a hook tab portion arranged at the same side of the pulling portion, the carriage further comprises a buckle secured in a mounting wall arranged at a rear side of the frame, the hook tab portion is detachably engagable with the buckle in a manner so as to retain the slide in the carriage housing.

14. The disk device as claimed in claim 13, wherein the sliding portion further defines at least one guiding channel therein for at least one corresponding guiding pin inserted therein, the at least one guiding channel extends along the first direction.

15. The disk device as claimed in claim 14, wherein the latching member comprises a bolt configured for detachably engaging with a stopping portion positioned on the tray along the second direction, a positioning pin protruded from the bolt and configured for engagable with the actuating portion, and a spring engaging around the bolt and configured for urging the positioning pin to contact at least one of the first guiding surface, the actuating surface and the second guiding surface, the positioning pin is movable between the first guiding surface and the second guiding surface via the actuating portion along with movements of the sliding portion.

16. The disk device as claimed in claim 15, wherein the bolt comprises a locking board configured for engaging with the stopping portion, a guiding rod configured for engaging in the spring, a blocking sheet for being urged by the spring, the locking board and the guiding rod are arranged at two opposite sides of the blocking sheet.

17. The disk device as claimed in claim 12, wherein the hook tab comprises a free end, two wedges arranged at two opposite sides of the free end and configured for being inserted into a clipping hole defined in the buckle.

18. The disk device as claimed in claim 17, wherein the frame further comprises a restricting wall juxtaposed to the mounting wall, the pulling portion defines a hollow therein for absorbing shocks generated between the pulling portion and the restricting wall.

* * * * *